US008989211B2

(12) United States Patent
Jeong et al.

(10) Patent No.: US 8,989,211 B2
(45) Date of Patent: Mar. 24, 2015

(54) APPARATUS AND METHOD FOR MANAGING CHANNEL RESOURCE

(71) Applicant: Electronics and Telecommunications Research Institute, Daejeon (KR)

(72) Inventors: Wun-Cheol Jeong, Daejeon (KR); Chang Sub Shin, Daejeon (KR); Tae Joon Park, Daejeon (KR); Hoyong Kang, Daejeon (KR); Kyohoon Son, Daejeon (KR); In Hawn Lee, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/655,081

(22) Filed: Oct. 18, 2012

(65) Prior Publication Data

US 2013/0094481 A1   Apr. 18, 2013

(30) Foreign Application Priority Data

Oct. 18, 2011   (KR) .................. 10-2011-0106539
Oct. 4, 2012    (KR) .................. 10-2012-0110277

(51) Int. Cl.
*H04L 12/43*    (2006.01)
*H04L 23/02*    (2006.01)
*H04W 72/04*    (2009.01)
*H04W 74/02*    (2009.01)
*H04W 84/18*    (2009.01)

(52) U.S. Cl.
CPC ........... *H04L 23/02* (2013.01); *H04W 72/0446* (2013.01); *H04W 74/02* (2013.01); *H04W 84/18* (2013.01)
USPC ........... 370/458; 370/230; 370/235; 455/509; 455/515

(58) Field of Classification Search
CPC .............. H04L 5/0012; H04L 12/4035; H04L 2012/5675; H04L 2012/6456; H04L 5/003; H04L 5/0092; H04L 5/0094; H04L 12/40065; H04L 25/0202; H04L 25/0204; H04L 25/0206; H04L 25/14; H04L 29/06088; H04J 3/1682; H04J 3/1694; H04J 3/1647; H04J 2203/0091; H04W 72/0446; H04W 74/02; H04W 84/18
USPC .................. 370/230, 235, 458; 455/509, 515, 455/226.1–226.4
See application file for complete search history.

(56) References Cited

U.S. PATENT DOCUMENTS

2010/0034159 A1* 2/2010 Shin et al. ..................... 370/329
2010/0046388 A1* 2/2010 Kim et al. ...................... 370/252

(Continued)

OTHER PUBLICATIONS

IEEE Computer Society, "IEEE Standard for Local and Metropolitan Area Networks—Part 15.4: Low-Rate Wireless Personal Area Networks (LR-WPANs), Amendment 1: MAC sublayer," IEEE Std 802.15.4e-2012, Sponsored by the LAN/MAN Standards Committee, 225 pages (2012).

*Primary Examiner* — Benjamin H Elliott, IV
(74) *Attorney, Agent, or Firm* — Nelson Mullins Riley & Scarborough LLP (57) ABSTRACT

An apparatus for managing a channel resource by a node sets a channel hopping sequence and a channel hopping offset value which are to be used, divides an assigned time slot into a plurality of subslots, divides a data frame for transmission into a plurality of subframes, and selects a channel for transmitting the plurality of subframes in the plurality of subslots, respectively, by channel hopping based on the channel hopping sequence, the channel hopping offset value, the index of the time slot, and the index of a subslot for transmitting a subframe.

17 Claims, 8 Drawing Sheets

(56) References Cited

U.S. PATENT DOCUMENTS

| | | | |
|---|---|---|---|
| 2010/0111050 A1* | 5/2010 | Jeong | 370/337 |
| 2010/0296493 A1* | 11/2010 | Lee et al. | 370/336 |
| 2012/0093163 A1* | 4/2012 | Miskowicz | 370/400 |
| 2013/0094481 A1* | 4/2013 | Jeong et al. | 370/336 |

* cited by examiner

APPARATUS AND METHOD FOR MANAGING CHANNEL RESOURCE

CROSS-REFERENCE TO RELATED APPLICATION

This application claims priority to and the benefit of Korean Patent Application No. 10-2011-0106539 and 10-2012-0110277 filed in the Korean Intellectual Property Office on Oct. 18, 2011 and Oct. 4, 2012, the entire contents of which are incorporated herein by reference.

BACKGROUND OF THE INVENTION (a) Field of the Invention

The present invention relates to an apparatus and method for managing a channel resource, and more particularly, to an apparatus and method for managing a channel resource, which are intended for channel hopping at a MAC (medium access control) layer and a PHY (physical) layer in beacon-based wireless personal network.

(b) Description of the Related Art

The most representative media access control (MAC) technology used to embody a service requiring a real-time property and a high reliability in a low power based wireless sensor network (WSN) system may support communication for an active duration after assigning an independent active duration according to a scheduling method.

For communication with another node device, a node device may receive data using carrier sense multiple access-collision avoidance (CSMA-CA) for a contention access period (CAP).

In a beacon-enabled operation mode, when a node device desires a deterministic channel access, the node device may be assigned with an independent time slot called a guaranteed time slot (GTS), and may perform the channel access. However, since such media access control (MAC) system employs a single frequency for a link usage period, the MAC system may be weak against an interference signal of the same radio frequency (RF) band and may not variably schedule a communication link bandwidth.

To solve the above issue in the MAC system using the single frequency, IEE802.15.4e standard proposed DSME (deterministic synchronous multi-channel extension) MAC, which is a channel access scheme using a time-slotted channel hopping protocol.

MAC frequency hopping (MAC FH) of DSME MAC is a channel hopping protocol used at the MAC layer, in which a node device transmits a data frame to a frequency channel set by a predetermined channel hopping sequence during each assigned time slot after passing through network connection and time slot assignment processes.

Meanwhile, PHY frequency hopping (PHY FH) has been used for the PHY layer in order to overcome physical degradation of reception signals, such as interference in a wireless zone and multipath channel fading. The PHY FH is a protocol in which multiple channels having a narrow bandwidth hop according to a predetermined channel hopping sequence.

The PHY FH is a protocol in which a single PPDU frame is divided into a plurality of subframes and the frequency hops in each subframe. This protocol is different from the MAC FH of the MAC changing the frequency channel in each frame. However, the problem of resource waste is caused because it is necessary for an upper layer of the MAC layer which manages a channel hopping sequence to have two hopping sequences for MAC-FH and PHY-FH in terms of resource management. Moreover, in the case that the network connection process and the time slot assignment process are separately carried out as in the DSME MAC, applications, such as a sensor network, requiring a network operation time of several years or longer, need a large overhead and therefore may require a large consumption of communication energy.

SUMMARY OF THE INVENTION

The present invention has been made in an effort to provide an apparatus and method for managing a channel resource, which are for managing MAC-FH and PHY-FH by using one channel hopping sequence.

Further, the present invention has been made in an effort to provide an apparatus and method for managing a channel resource, which are for reducing power consumption for data transmission and communication overhead.

An exemplary embodiment of the present invention provides a method for managing a channel resource by a node in a wireless network. The channel resource management method includes: assigning a time slot; dividing the time slot into a plurality of subslots; dividing a data frame into a plurality of subframes; and selecting a channel for transmitting the plurality of subframes in the plurality of subslots, respectively.

The selecting may include estimating a channel for transmitting a corresponding subframe in a j-th subslot of an i-th time slot by the following equation:

$CH(i,j)$=channel hopping sequence $((i+j$+channel hopping offset value+sequence number of beacon frame) % number of physical frequency channels supported by PHY).

The channel resource management method may further include receiving the beacon frame before assigning the time slot.

The channel resource management method may further include setting the channel hopping sequence used for the wireless network and the channel hopping offset value, through the beacon frame.

The assigning may include selecting a time slot among empty time slots through the beacon frame.

The selecting of a time slot may include generating a random number having the same selection probability and selecting a time slot among the empty time slots.

The assigning may include selecting a time slot through time slot assignment negotiation with an upper-level node of the node.

The selecting may include estimating transmission timing for transmitting the plurality of subframes.

The estimating of transmission timing may be performed by using a transmission delay time, which is caused by back-off of CSMA/CA (carrier sense multiple access/collision avoidance).

The selecting may include estimating a channel for transmitting a corresponding subframe in a j-th subslot of an i-th time slot by the following equation:

$CH(i,j)$=channel hopping sequence $((i+j+d$+channel hopping offset value+sequence number of beacon frame) % number of physical frequency channels supported by PHY), where d may be a parameter value determined by the transmission delay time.

Another exemplary embodiment of the present invention provides an apparatus for managing a channel resource to transmit a data frame in a wireless network. The channel resource management apparatus includes a setting unit, a time slot assignment unit, a time slot and frame dividing unit, and a channel selection unit. The setting unit sets a channel hopping sequence and a channel hopping offset value which are to be used. The time slot assignment unit assigns a time slot. The time slot and frame dividing unit divides the time slot into a plurality of subslots, and divides a data frame into a plurality of subframes. The channel selection unit selects a channel for transmitting the plurality of subframes in the plurality of subslots, respectively, by using the channel hopping sequence, the channel hopping offset value, the index of the time slot, and the index of a subslot for transmitting a subframe.

The channel selection unit may select a channel in a j-th subslot of an i-th time slot as CH(i,j)=channel hopping sequence ((i+j+channel hopping offset value+sequence number of beacon frame) % number of physical frequency channels supported by PHY).

The channel selection unit may estimate transmission timing for transmitting the plurality of subframes by using a transmission delay time, which is caused by backoff of CSMA/CA (carrier sense multiple access/collision avoidance).

The channel selection unit may select a channel in a j-th subslot of an i-th time slot as CH(i,j)=channel hopping sequence ((i+j+d+channel hopping offset value+sequence number of beacon frame) % number of physical frequency channels supported by PHY), where d may be a parameter value determined by the transmission delay time.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

Now, an apparatus and method for managing a channel resource according to an exemplary embodiment of the present invention will be described in detail with reference to the drawings.

Figure 1:
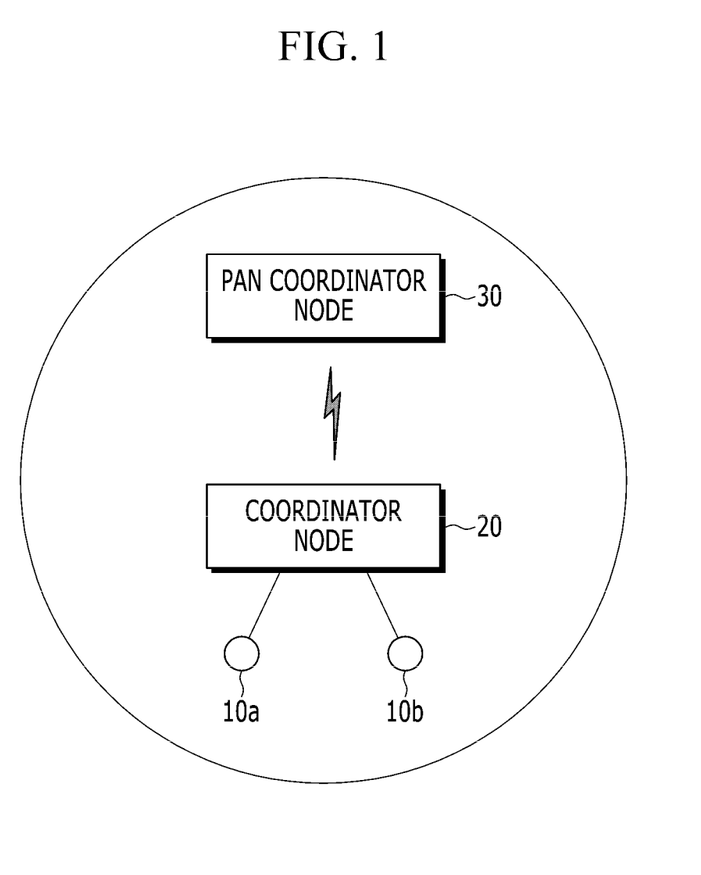
FIG. 1 is a view showing an example of a wireless network system according to an exemplary embodiment of the present invention.

FIG. 1 is a view showing an example of a wireless network system according to an exemplary embodiment of the present invention.

Referring to FIG. 1, the wireless network system includes a PAN (personal area network) coordinator node 30, a coordinator node 20, and terminal nodes 10a and 10b.

The PAN coordinator node 30 is a device that is in charge of creating a network. It broadcasts a periodic beacon to provide network configuration-related information to a node that wants to connect to the network. The network configuration-related information may include a network frame structure, a channel hopping sequence identifier, a time slot occupying state bitmap, and visual information.

The coordinator node 20 is connected to the network via the PAN coordinator node 30 or some other coordinator node, and exchanges frames with the terminal nodes 10a and 10b or some other coordinator nodes. The coordinator node 20 serves to broadcast a periodic beacon, and acts as a relay node for relaying a data frame in the network.

The terminal nodes 10a and 10b exist on the most remote ends of the network, and are devices which obtain sensing information and transmit it to the coordinator node 20. Data frame transmission between the terminal nodes 10a and 10b and the coordinator node 20 takes place after accessing a channel by channel hopping in a contention free period (CFP).

Figure 2:
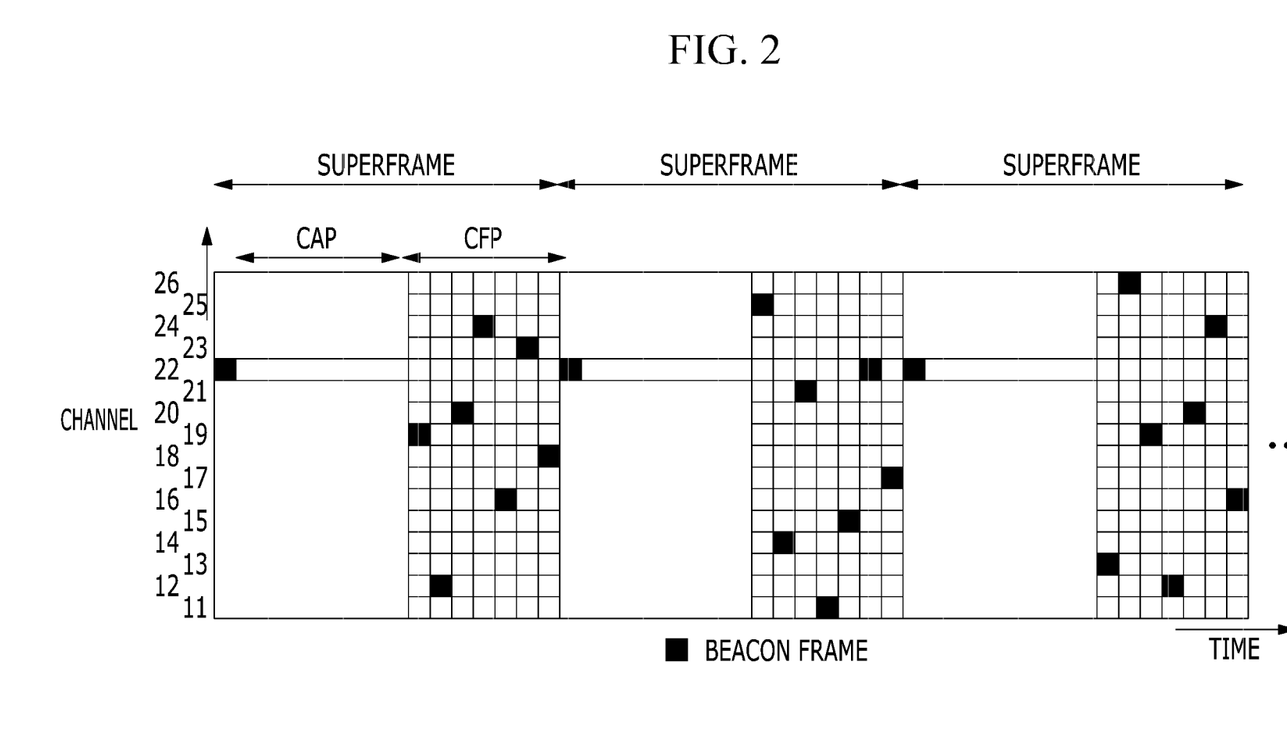
FIG. 2 is a view showing a multi-superframe structure in a wireless sensor network system according to an exemplary embodiment of the present invention.

FIG. 2 is a view showing a multi-superframe structure in a wireless sensor network system according to an exemplary embodiment of the present invention.

Referring to FIG. 2, a multi-superframe includes a plurality of superframes. Each superframe includes a beacon frame, a contention access period (CAP), and a contention free period (CFP). A plurality of time slots are assigned to the CFP. The CFP is divided into a plurality of time slots along the time axis and divided into a plurality of channels along the frequency axis. An area defined by one time slot and one channel may be defined as a deterministic and synchronous multi-channel extension guaranteed time slot (DSME-GTS).

The terminal nodes 10a and 10b access a channel by channel hopping in the contention free period (CFP) and transmit a data frame to the coordinator node 20.

Since the number of DSME-GTSs that a terminal node can use in one superframe is restricted, the multi-superframe is used by grouping the plurality of superframes as shown in FIG. 2. The size and structure of the multi-superframe may depend on values of beacon order (BO), superframe order (SO), and multi-superframe order (MO). The BO denotes an interval at which a coordinator transmits the beacon frame, and the SO denotes the length of the superframe. The MO denotes the length of the multi-superframe, which is a cycle of a repeated DSME-GTS allocation schedule.

Figure 3:
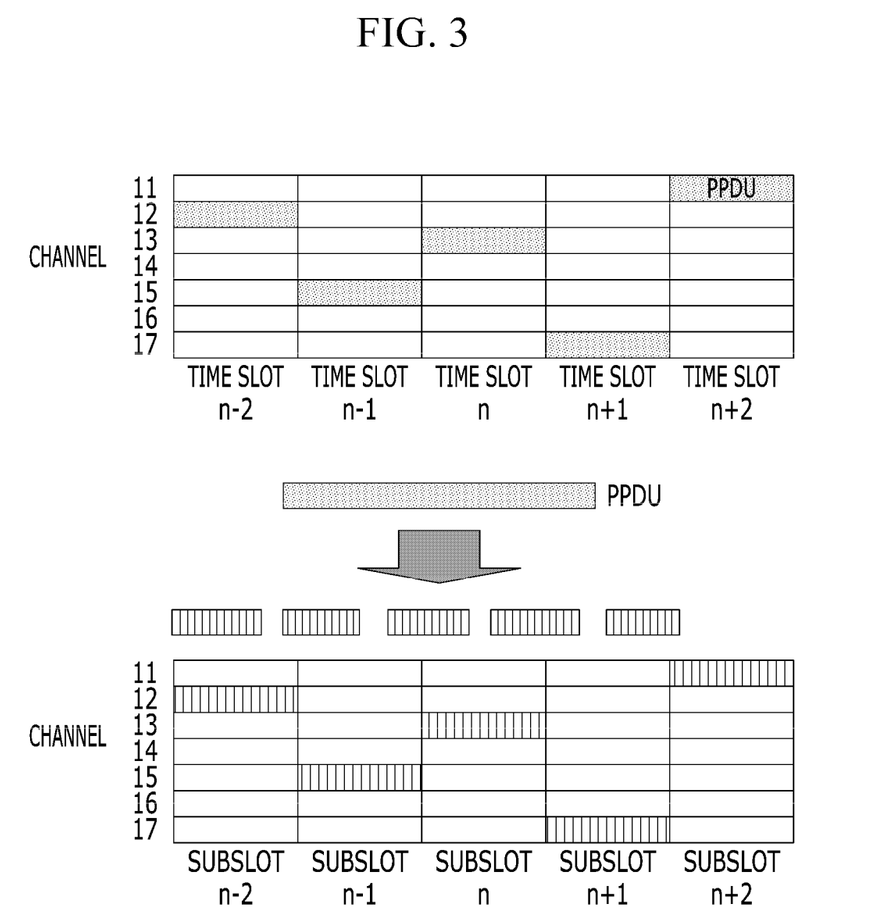
FIG. 3 is a view schematically showing a channel hopping protocol according to an exemplary embodiment of the present invention.

FIG. 3 is a view schematically showing a channel hopping protocol according to an exemplary embodiment of the present invention.

As shown in FIG. 3, when the terminal nodes 10a and 10b are assigned one time slot during which a PPDU (PHY protocol data unit) is to be transmitted, they divide the PDU into a plurality of subframes, divide the time slot into a plurality of subslots, and then transmit each subframe by subslot-based frequency hopping.

In an i-th time slot, the terminal nodes 10a and 10b estimate a channel for transmitting a subframe in a j-th subslot by Equation 1.

$$CH(i,j) = \text{macHoppingSequenceList}((i+j+\text{macChannelOffset}+\text{macPANCoordBSN}) \% \text{phyChannelsSupported})$$ [Equation 1]

where i is the index of the time slot within the multi-superframe, and j is the index of a desired subframe to be transmitted. macHoppingSequenceList is a channel hopping sequence used for the network, macChannelOffset is a channel hopping offset value of a target node a terminal node wants to transmit in a frame, and macPANCoordBSN is a sequence number of a beacon frame used by the PAN coordinator node 30 of the multi-superframe. phyChannelsSupported is the number of physical frequency channels supported by the PHY layer, which varies according to the PHY used by the terminal nodes 10a and 10b. % indicates the remaining modulus operators.

When a channel is thus estimated, the terminal nodes 10a and 10b transmit the corresponding subframe over the estimated channel during an assigned slot.

Figure 4:
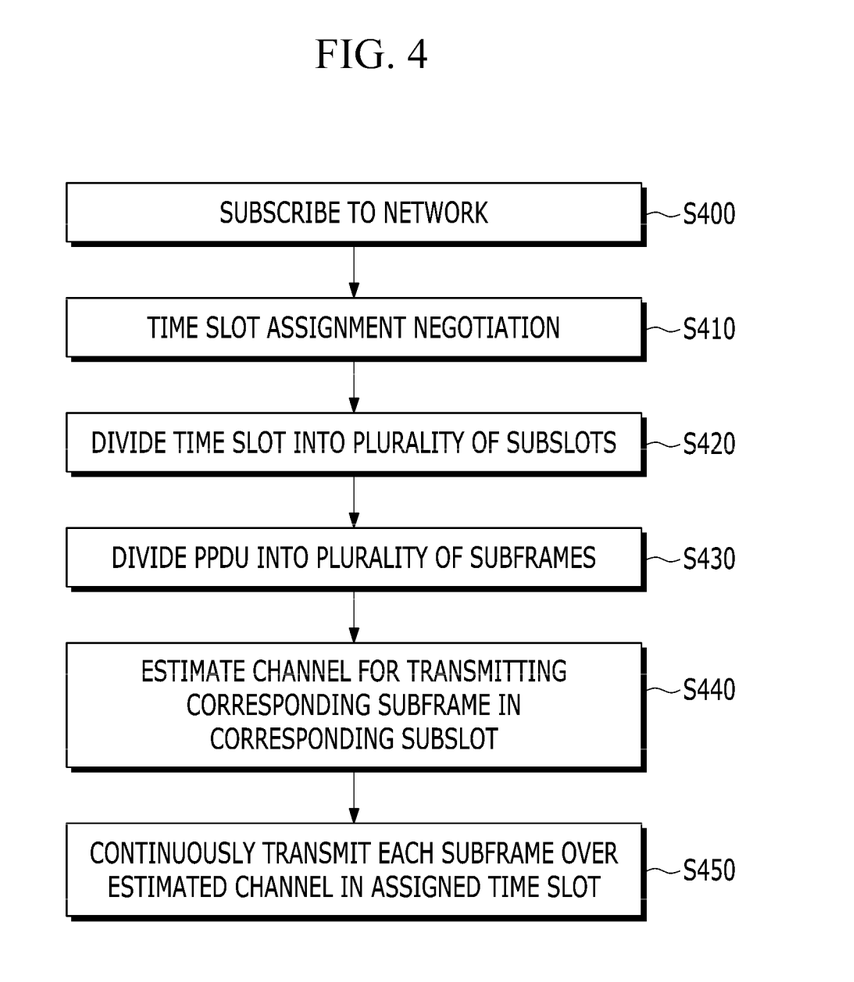
FIG. 4 is a flowchart showing a channel hopping method for a terminal node according to a first exemplary embodiment of the present invention.

FIG. 4 is a flowchart showing a channel hopping method for a terminal node according to a first exemplary embodiment of the present invention.

Referring to FIG. 4, a terminal node (e.g., 10a) selects a parent coordinator node by beacons broadcasted by neighboring coordinator nodes, and subscribes to the network through the parent coordinator node (S400).

The terminal node 10a sets a channel hopping sequence to be used for the network and a channel hopping offset value to be used by itself through a network subscription procedure.

Afterwards, the terminal node 10a is assigned a time slot for data frame transmission through the process of time slot assignment negotiation with the coordinator node 20 (S410). The assigned time slot is a time interval that the terminal node 10a can periodically use for data transmission. The assigned slot is dedicated to the corresponding node regardless of whether there are data to transmit.

The terminal node 10a divides the assigned time slot into a plurality of subslots to be transmitted (S420), and divides a PPDU into a plurality of subframes in the plurality of subslots (S430).

Then, the terminal node 10a estimates a channel for transmitting the corresponding subframe in each of the first to last subslots by Equation 1 (S440).

In this way, when a channel for transmitting a subframe in every subslot is estimated, the terminal node 10a continuously transmits the corresponding subframes over the estimated channel in the assigned time slot (S450).

Figure 5:
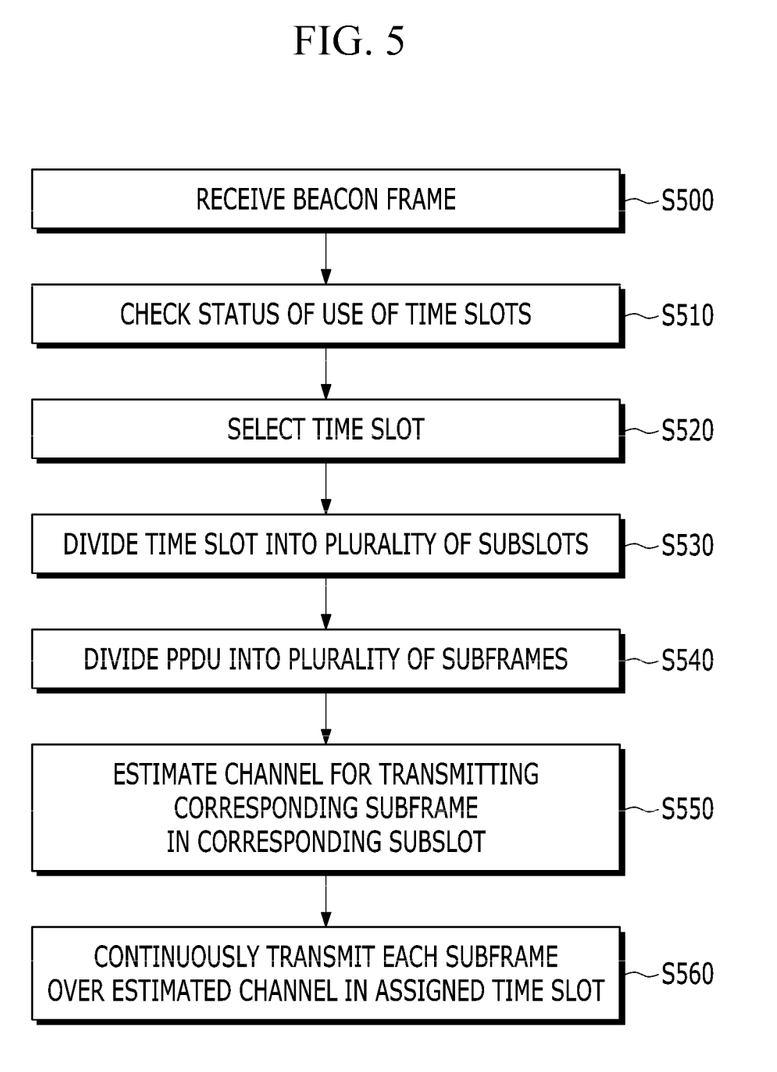
FIG. 5 is a flowchart showing a channel hopping method for a terminal node according to a second exemplary embodiment of the present invention.

FIG. 5 is a flowchart showing a channel hopping method for a terminal node according to a second exemplary embodiment of the present invention. The terminal node 10a directly accesses a channel in an empty time slot, without going through the process of time slot assignment negotiation after connecting to the PAN. Although it is possible to reduce overhead caused by the process of time slot assignment negotiation because the terminal node 10a does not go through this process, it is inevitable that a collision will occur when multiple terminal nodes try to access a channel in one time slot.

Referring to FIG. 5, in order to reduce the possibility of such a collision, the terminal node 10a firstly receives a beacon frame broadcasted by the coordinator node (S500), and checks the status of use of time slots, including which time slot is not occupied, through the received beacon frame (S510).

Figure 6:
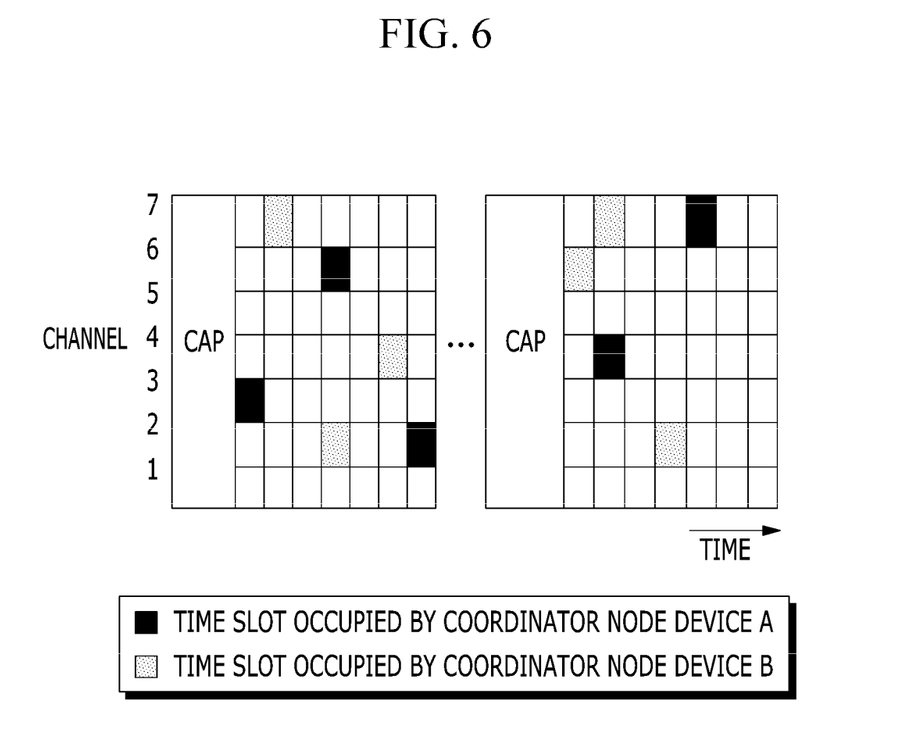
FIG. 6 is a view showing an example of a time slot assignment bitmap of beacon frames.

FIG. 6 is a view showing an example of a time slot assignment bitmap of beacon frames, and more specifically, a time slot assignment bitmap of beacon frames broadcasted by coordinator node A and coordinator node B.

For an illustrative purpose, it is assumed that a channel hopping sequence {1, 2, 3, 4, 5, 6, 7} is used and the channel offset values of coordinator node A and coordinator node B are 2 and 5, respectively. 0 of the bitmap indicates that the corresponding time slot is not used, and 1 of the bitmap indicates that the corresponding time slot is used by another node device. Since the channel offset values used by coordinator nodes A and B are different, channel resources used by the coordinator nodes A and B in a specific time slot do not overlap even though the same hopping sequence is used in the network. The terminal node 10a hears a beacon frame and selects a time slot indicated by 0 from the bitmap (S520). If a plurality of terminal nodes 10a which have heard a beacon frame transmit subframes in the same time slot, it is inevitable that a frame collision will occur. To reduce the possibility of such a collision, the terminal node 10a generates a random number having the same selection probability and selects a time slot among the time slots indicated by 0. For example, if the first, fourth, and fifth time slots are not occupied by other node devices, the terminal node 10a wanting to transmit a frame selects one of these three time slots with a ratio of 1 to 3.

Next, the terminal node 10a estimates a channel for transmitting a subframe by the channel hopping of Equation 1, as explained in FIG. 4, in the selected time slot (S530 to S550).

In this way, when a channel for transmitting a subframe in every subslot is estimated, the terminal node 10a continuously transmits a plurality of subframes over the estimated channel in the assigned time slot (S560).

Figure 7:
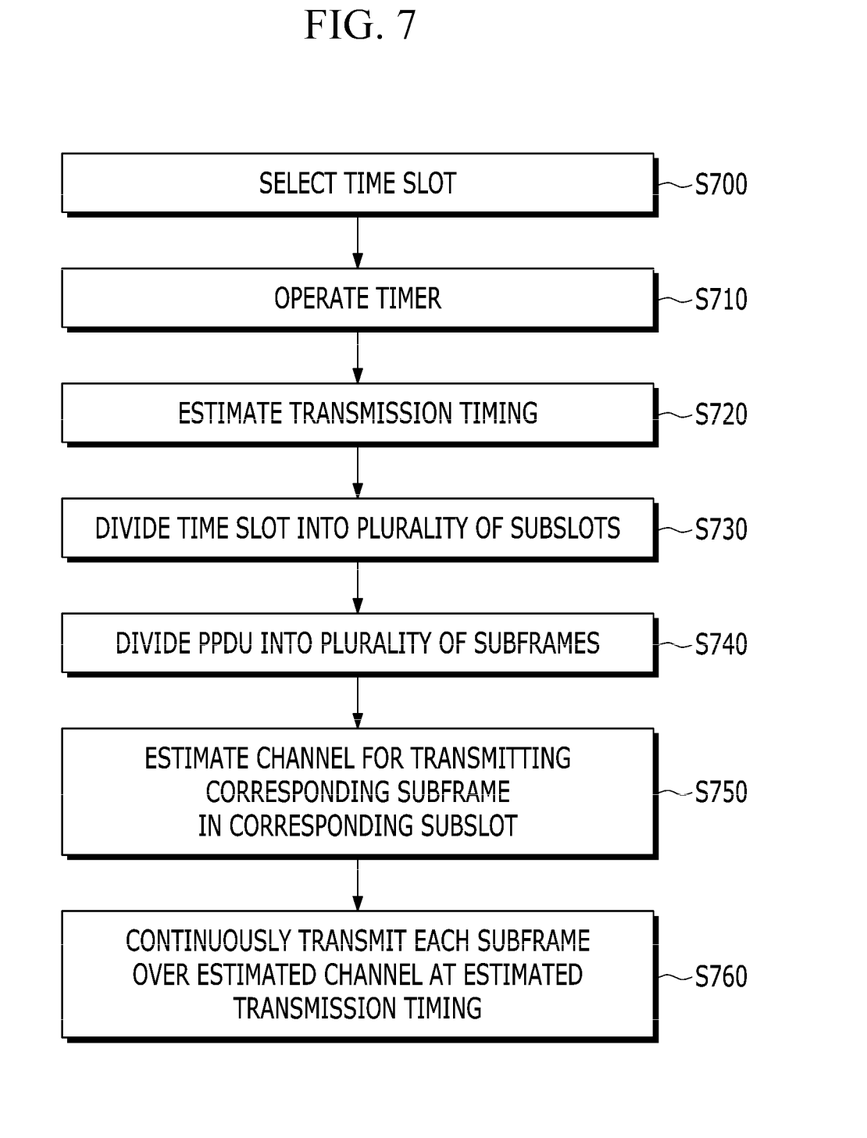
FIG. 7 is a flowchart showing a channel hopping method for a terminal node according to a third exemplary embodiment of the present invention.

FIG. 7 is a flowchart showing a channel hopping method for a terminal node according to a third exemplary embodiment of the present invention.

Referring to FIG. 7, when a time slot for data frame transmission is selected by the method explained in FIG. 5 and the method explained in FIG. 4 (S700), the terminal node 10a operates a timer until the corresponding time slot is reached, in order to transmit a subframe (S710). When a time value of the timer reaches the corresponding time slot, the terminal node 10a estimates transmission timing by using CSMA-CA (carrier sense multiple access-collision avoidance) (S720). The transmission timing depends on a certain transmission delay time $t_d$ of the first subframe, which is caused by the backoff of CSMA-CA. The actual transmission time of a subframe to be transmitted in a j-th subslot is set in multiples of a subframe transmission time $t_{subframe}$ from the start point of the corresponding time slot.

That is, the transmission time $t_{send}$ of the subframe to be transmitted in the j-th subslot may be determined as shown in Equation 2.

$$t_{send} = [d+j-1] * t_{subframe}$$ [Equation 1]

where d is defined as $\text{ceil}(t_d/t_{subframe})$. Ceil(x) indicates the smallest integer greater than x.

Next, the terminal node estimates a channel for transmitting subframes by a channel hopping protocol in a selected time slot (S730-S750). That is, in an i-th time slot, the terminal node 10a estimates a channel for transmitting a subframe in the j-th subslot by the following Equation 3.

$$CH(i,j) = \text{macHoppingSequenceList}((i+j+d+\text{macChannelOffset}+\text{macPANCoordBSN}) \% \text{phyChannelsSupported})$$ [Equation 3]

In this way, when a channel for transmitting a subframe in every subslot is estimated, the terminal node 10a continuously transmits the corresponding subframes over the estimated channel at the estimated transmission timing in the assigned time slot (S760).

Each subframe is transmitted in the channel hopping protocol of Equation 3, the first subframe is transmitted in the CSMA-CA scheme, and the other subframes are continuously transmitted without CSMA-CA. This is to minimize collision when a plurality of terminal nodes simultaneously access the channel to transmit a frame in the corresponding time slot.

Figure 8:
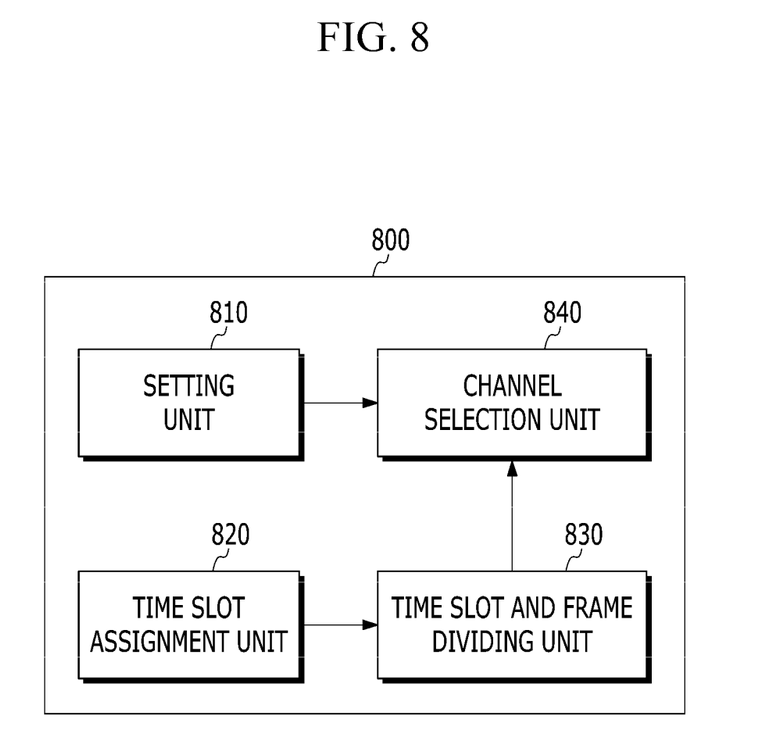
FIG. 8 is a view showing an apparatus for managing a channel resource by a terminal node which does the channel hopping explained in FIGS. 4 to 7.

FIG. 8 is a view showing an apparatus for managing a channel resource by a terminal node which does the channel hopping explained in FIGS. 4 to 7.

Referring to FIG. 8, a channel resource management apparatus 800 includes a setting unit 810, a time slot assigning unit 820, a time slot and frame dividing unit 830, and a channel selection unit 840. The terminal nodes 10a and 10b of FIG. 1 includes the channel resource management apparatus 800.

The setting unit 810 sets a channel hopping sequence to be used for the network and a channel hopping offset value to be used by its own terminal nodes 10a and 10b. The channel hopping sequence and the channel hopping offset value may be obtained through a network subscription procedure. The channel hopping sequence used for the network may be obtained through a channel hopping sequence contained in a beacon frame. In the case of the process of time slot assignment negotiation, the channel hopping offset value to be used by its own terminal nodes 10a and 10b may be negotiated, and the channel hopping offset value to be used by its own terminal nodes 10a and 10b may be equal to the channel hopping offset value of the node broadcasting the beacon frame in the superframe to be used by its own terminal nodes 10a and 10b.

The time slot assignment unit 820 assigns a time slot for transmitting a PPDU. The time slot assignment unit 820 may be assigned a time slot from the coordinator node 20 through the process of time slot assignment negotiation with the coordinator node 20, as explained in FIG. 4, or may receive a beacon frame and assign an empty time slot which is not occupied by other terminal nodes, as explained in FIG. 5.

The time slot and frame dividing unit 830 divides the time slot assigned by the time slot assignment unit 820 into a plurality of subslots. Moreover, the time slot and frame dividing unit 830 divides the PPDU into a plurality of subframes that the plurality of subslots can transmit, respectively.

The channel selection unit 840 selects a channel for transmitting a subframe in each subslot. The channel selection unit 840 may select a channel for transmitting a subframe by Equation 1 or by Equation 3.

According to an exemplary embodiment of the present invention, the problem of resource waste can be solved by managing MAC-FH and PHY-FH by one channel hopping sequence in a beacon-based wireless personal network, wireless interference with different types of wireless devices can be decreased due to the pseudo-randomness of the channel hopping sequence, and the overhead on channel management can be reduced because channel hopping between two layers is managed by the same channel.

Moreover, a node device is allowed to directly transmit a data frame to a time slot without the process of time slot assignment negotiation, thereby reducing the power consumption of the node device and the communication overhead on the node device. Accordingly, it is possible to increase the low-power efficiency of a low-price node device that has extremely low energy consumption.

By using this channel hopping protocol for the channel resource management apparatus 800, there is no need to separately do channel hopping at the MAC layer and the PHY layer. Therefore, channel hopping between the MAC layer and the PHY layer can be managed by the same channel resource, and this can reduce the overhead of channel management. The exemplary embodiments of the present invention may also be implemented by a program realizing functions corresponding to the construction of the embodiment, and a recording medium on which the program is recorded, other than the apparatus and/or method described above. Such implementation may be easily made from the disclosure of the above embodiments by those skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for managing a channel resource by a node in a wireless network, comprising:

assigning, by a channel resource management apparatus, a time slot;

dividing, by the channel resource management apparatus, the time slot into a plurality of subslots;

dividing, by the channel resource management apparatus, a data frame for transmitting to a target node into a plurality of subframes; and selecting, by the channel resource management apparatus, a channel for transmitting the plurality of subframes in the plurality of subslots using a channel hopping sequence and a channel hopping offset value of the target node, respectively.

2. The method of claim 1, wherein the selecting comprises estimating a channel for transmitting a corresponding subframe in a j-th subslot of an i-th time slot by the following Equation:

$CH(i,j)$=the channel hopping sequence $((i+j+$the channel hopping offset value+sequence number of beacon frame) % number of physical frequency channels supported by a physical layer), wherein the % indicates a remaining modulus operator.

3. The method of claim 1, further comprising receiving a beacon frame before assigning the time slot.

4. The method of claim 3, further comprising setting the channel hopping sequence used for the wireless network and the channel hopping offset value, through the beacon frame.

5. The method of claim 3, wherein the assigning comprises selecting a time slot among empty time slots through the beacon frame.

6. The method of claim 5, wherein the selecting of a time slot comprises generating a random number having a selection probability that is one out of the number of empty slots and selecting a time slot among the empty time slots.

7. The method of claim 3, wherein the assigning comprises selecting a time slot through time slot assignment negotiation with an upper-level node of the node.

8. The method of claim 1, wherein the selecting comprises estimating transmission timing for transmitting the plurality of subframes.

9. The method of claim 8, wherein the estimating of transmission timing is performed by using a transmission delay time, which is caused by backoff of CSMA/CA (carrier sense multiple access/collision avoidance).

10. The method of claim 8, wherein the selecting comprises estimating a channel for transmitting a corresponding subframe in a j-th subslot of an i-th time slot by the following equation:

$CH(i,j)$=the channel hopping sequence (($i+j+d$+the channel hopping offset value +sequence number of beacon frame) % number of physical frequency channels supported by a physical layer), wherein the % indicates a remaining modulus operator, where d is a parameter value determined by the transmission delay time.

11. An apparatus for managing a channel resource to transmit a data frame in a wireless network, the apparatus comprising:
   a setting unit that sets, via a terminal, a channel hopping sequence and a channel hopping offset value which are to be used;
   a time slot assignment unit that assigns, via the terminal, a time slot;
   a time slot and frame dividing unit that divides, via the terminal, the time slot into a plurality of subslots, and divides a data frame for transmitting to a target node into a plurality of subframes;
   a channel selection unit that selects, via the terminal a channel for transmitting the plurality of subframes in the plurality of subslots using the channel hopping sequence and the channel hopping offset value of the target node, respectively, by using the channel hopping sequence, the channel hopping offset value, a first index of the time slot, and a second index of a subslot for transmitting a subframe.

12. The apparatus of claim 11, wherein the channel selection unit selects a channel in a j-th subslot of an i-th time slot as $CH(i,j)$ =channel hopping sequence ((i+j+ channel hopping offset value + sequence number of beacon frame) % number of physical frequency channels supported by a physical layer), wherein the % indicates a remaining modulus operator.

13. The apparatus of claim 11, wherein the channel selection unit estimates a transmission timing for transmitting the plurality of subframes by using a transmission delay time, which is caused by backoff of CSMA/CA (carrier sense multiple access/collision avoidance).

14. The apparatus of claim 13, wherein the channel selection unit selects a channel in a j-th subslot of an i-th time slot as $CH(i,j)$ = the channel hopping sequence ((i+j+d+ the channel hopping offset value + sequence number of beacon frame) % number of physical frequency channels supported by a physical layer), wherein the % indicates a remaining modulus operator,
   where d is a parameter value determined by the transmission delay time.

15. The apparatus of claim 11, wherein the time slot assignment unit receives a beacon frame and selects a time slot among empty time slots.

16. The apparatus of claim 15, wherein the time slot assignment unit selects a time slot among the empty slots by using a random number having a selection probability that is one out of the number of empty slots.

17. The apparatus of claim 11, wherein the time slot assignment unit is assigned a time slot from an upper-level node through time slot assignment negotiation with the upper-level node.

* * * * *

UNITED STATES PATENT AND TRADEMARK OFFICE
CERTIFICATE OF CORRECTION

PATENT NO.        : 8,989,211 B2
APPLICATION NO.   : 13/655081
DATED             : March 24, 2015
INVENTOR(S)       : Wun-Cheol Jeong et al.

It is certified that error appears in the above-identified patent and that said Letters Patent is hereby corrected as shown below:

Title page, column 1, line 5 (72) Six inventor: "In Hawn Lee" should be --In Hwan Lee--.

Signed and Sealed this
Fourteenth Day of July, 2015

Michelle K. Lee
*Director of the United States Patent and Trademark Office*